US007111461B2

(12) United States Patent
Richey

(10) Patent No.: US 7,111,461 B2
(45) Date of Patent: Sep. 26, 2006

(54) SYSTEM AND METHOD FOR TESTING A ROTARY FLOW DEVICE

(75) Inventor: Martyn J. Richey, Chesterfield, IN (US)

(73) Assignee: Honeywell International, Inc., Morristown, NJ (US)

( * ) Notice: Subject to any disclaimer, the term of this patent is extended or adjusted under 35 U.S.C. 154(b) by 186 days.

(21) Appl. No.: 10/923,224

(22) Filed: Aug. 20, 2004

(65) Prior Publication Data

US 2006/0037316 A1 Feb. 23, 2006

(51) Int. Cl.

| | |
|---|---|
| ***G06G 7/70*** | (2006.01) |
| ***G06F 19/00*** | (2006.01) |
| ***G01L 3/00*** | (2006.01) |
| ***F01D 21/00*** | (2006.01) |
| ***F01D 17/16*** | (2006.01) |
| ***F02B 37/24*** | (2006.01) |
| ***F04B 27/02*** | (2006.01) |
| *F01D 17/14* | (2006.01) |

(52) U.S. Cl. .............................. 60/602; 60/611; 415/1; 415/26; 415/29; 415/48; 415/49; 415/118; 701/100

(58) Field of Classification Search .................. 60/602, 60/611; 415/1, 26, 29, 48, 49, 118; 701/100
See application file for complete search history.

(56) References Cited

U.S. PATENT DOCUMENTS

| | | | | |
|---|---|---|---|---|
| 5,947,680 | A * | 9/1999 | Harada et al. | 415/26 |
| 6,314,737 | B1 | 11/2001 | Springer et al. | |
| 6,341,238 | B1 | 1/2002 | Modeen et al. | |
| 6,782,317 | B1 * | 8/2004 | Mitchell et al. | 701/100 |
| 6,820,503 | B1 * | 11/2004 | Sueyoshi et al. | 73/862.08 |
| 7,031,824 | B1 * | 4/2006 | Gangopadhyay | 60/611 |
| 2003/0167767 | A1 | 9/2003 | Arnold | |
| 2003/0182940 | A1 | 10/2003 | Nishiyama et al. | |

OTHER PUBLICATIONS

Magnuson MP112 Supercharger, http://www.myhps.com/index.php?submenu=Supercharger&src=gendocs&link=MagnusonMP112Supercharger, Copyright 2005 High Performance Systems, p. 1 of 1.*
RMS Supercharger, http://www.dynospotracing.com/rms.htm, DSR, 1798 Angela Street, San Jose, CA 95125, p. 1 of 3.*
Search Report for PCT/US2005/029484 dated Jan. 23, 2006.

* cited by examiner

*Primary Examiner*—Sheldon J Richter
(74) *Attorney, Agent, or Firm*—C John James; Wick Gallo

(57) ABSTRACT

A diagnostic system and method for testing the operation of a rotary flow device, such as a turbine or compressor of a turbocharger with a variable-geometry mechanism, such as adjustable vanes, is provided. The system includes a flow generator configured to provide a flow of gas through the device, a power source configured to adjust a position of the variable vanes or other variable-geometry mechanism of the device, and a controller configured to selectively control the adjustment of the position of the vanes. The controller and power source can be configured to actuate the variable vanes to at least one predetermined position so that an operational condition of the device can be determined according to the flow of air through the device. For example, the system can detect the operation of a valve or other adjustment device that controls the position of the vanes. Further, the system can monitor the flow of gas through the device to detect the configuration and operability of the vanes.

26 Claims, 3 Drawing Sheets

SYSTEM AND METHOD FOR TESTING A ROTARY FLOW DEVICE

FIELD OF THE INVENTION

The present invention relates generally to the testing of rotary flow devices and, more particularly, to a diagnostic system and method for testing the operation of a rotary flow device such as a turbine of a turbocharger.

BACKGROUND OF THE INVENTION

Turbochargers are typically used to increase the power output of an internal combustion engine such as in an automobile or other vehicle. A conventional turbocharger includes a turbine and a compressor. The turbine is rotatably driven by the exhaust gas from the engine. A shaft connects the turbine to the compressor and thereby rotates the compressor. As the compressor rotates, it compresses air that is then delivered to the engine as intake air. The increase in pressure of the intake air increases the power output of the engine.

Modern turbochargers can be complex devices. In particular, the turbine and/or compressor of a turbocharger can be configured to adjust according to the operating condition of the turbocharger and the engine. For example, a variable nozzle turbine (VNT) typically includes variable vanes that adjust according to such operational parameters as the speed and load of the engine and atmospheric conditions. By adjusting the configuration of the vanes, the turbine and, hence, the turbocharger can be made to perform efficiently throughout a range of operation with the engine. One variable nozzle turbine is described in U.S. Pat. No. 6,679,057, entitled "VARIABLE GEOMETRY TURBOCHARGER," issued Jan. 20, 2004, which is assigned to the assignee of the present invention. Alternatively, another variable-geometry mechanism such as an adjustable piston can be provided for adjusting the flow path through the turbine.

Testing a turbocharger, or the components of a turbocharger, can be difficult. For example, if a problem is detected with an engine or turbocharger of an automobile, it may be difficult to determine if the problem is a result of a malfunction in the engine or the turbocharger, since the two devices may be somewhat interdependent. Further, even if the turbocharger is removed from the engine, it may be difficult or impossible to verify the proper operation of the turbocharger by making a visual inspection of the turbocharger. For example, it may be difficult or impossible to inspect the operation of the adjustable vanes of the turbine or other dynamic aspects of the turbocharger.

Test equipment is conventionally used during the turbocharger manufacturing process, i.e., "end-of-line" equipment that tests the operation of turbochargers after manufacture. Such test equipment can provide a flow of oil to a number of the turbochargers, provide a high pressure air supply at one or more inlet of each turbocharger, and actuate the vanes of each turbocharger while the pressure drop through each turbocharger is measured. Thus, the test equipment can determine if the vanes and other parts of each turbocharger are properly assembled and operating, e.g., according to the drop in pressure that is measured with the vanes in different positions. A flow of oil is typically also delivered to the turbochargers during testing. However, such end-of-line test equipment is typically capable of only static testing. That is, the high pressure air provided at the inlet(s) of the turbocharger does not substantially rotate the turbines or compressors of the turbochargers. Further, the pressure differential(s) across the ports of the turbochargers are measured, but not the rates of flow therethrough.

Thus, there exists a need for an improved system and method for diagnostically testing a rotary flow device such as a turbine or compressor of a turbocharger. The system should be capable of testing aspects of the device with the device adjusted to one or more operational configurations.

BRIEF DESCRIPTION OF THE SEVERAL VIEWS OF THE DRAWINGS

Figure 1:
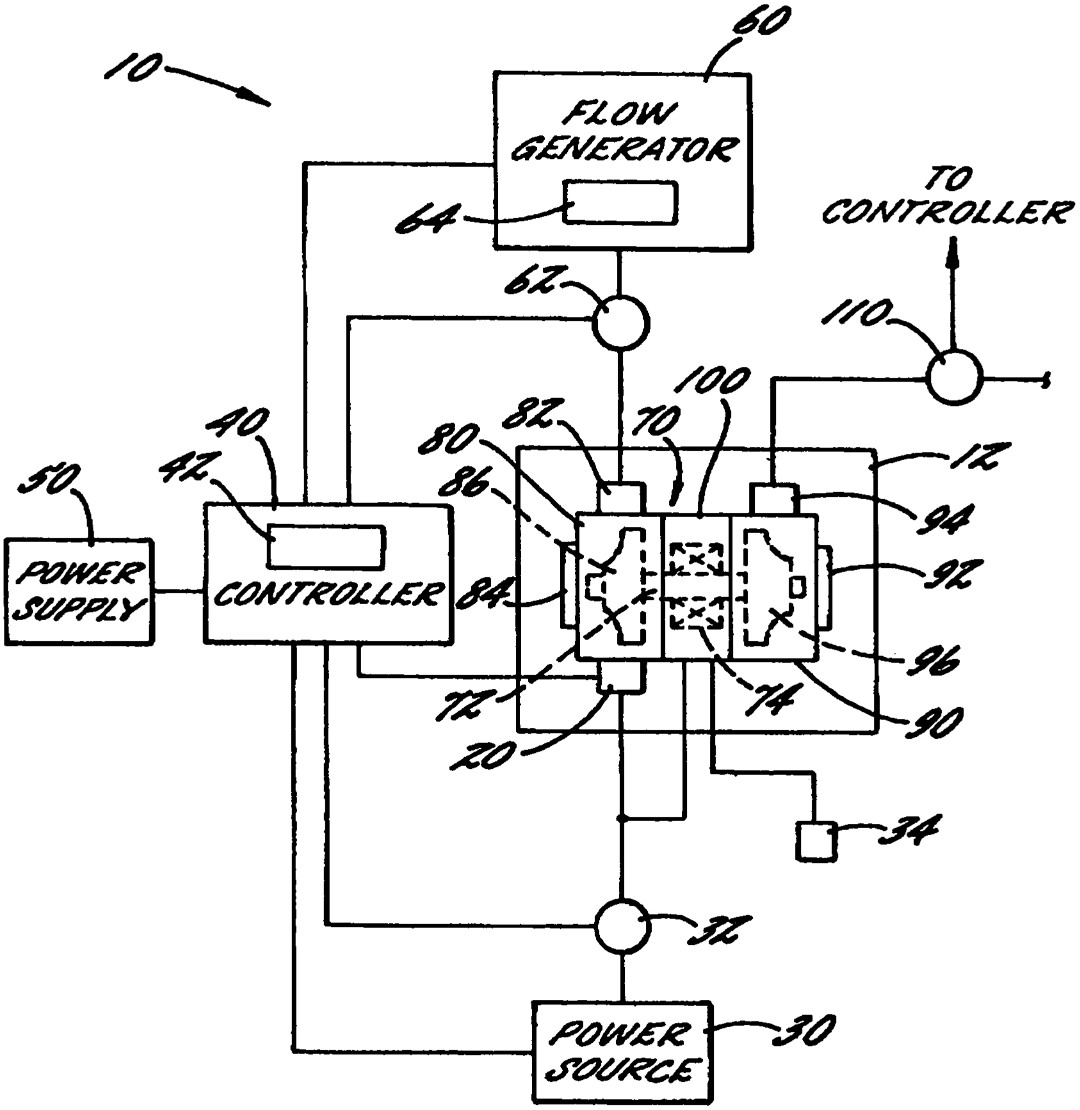
Figure 2:
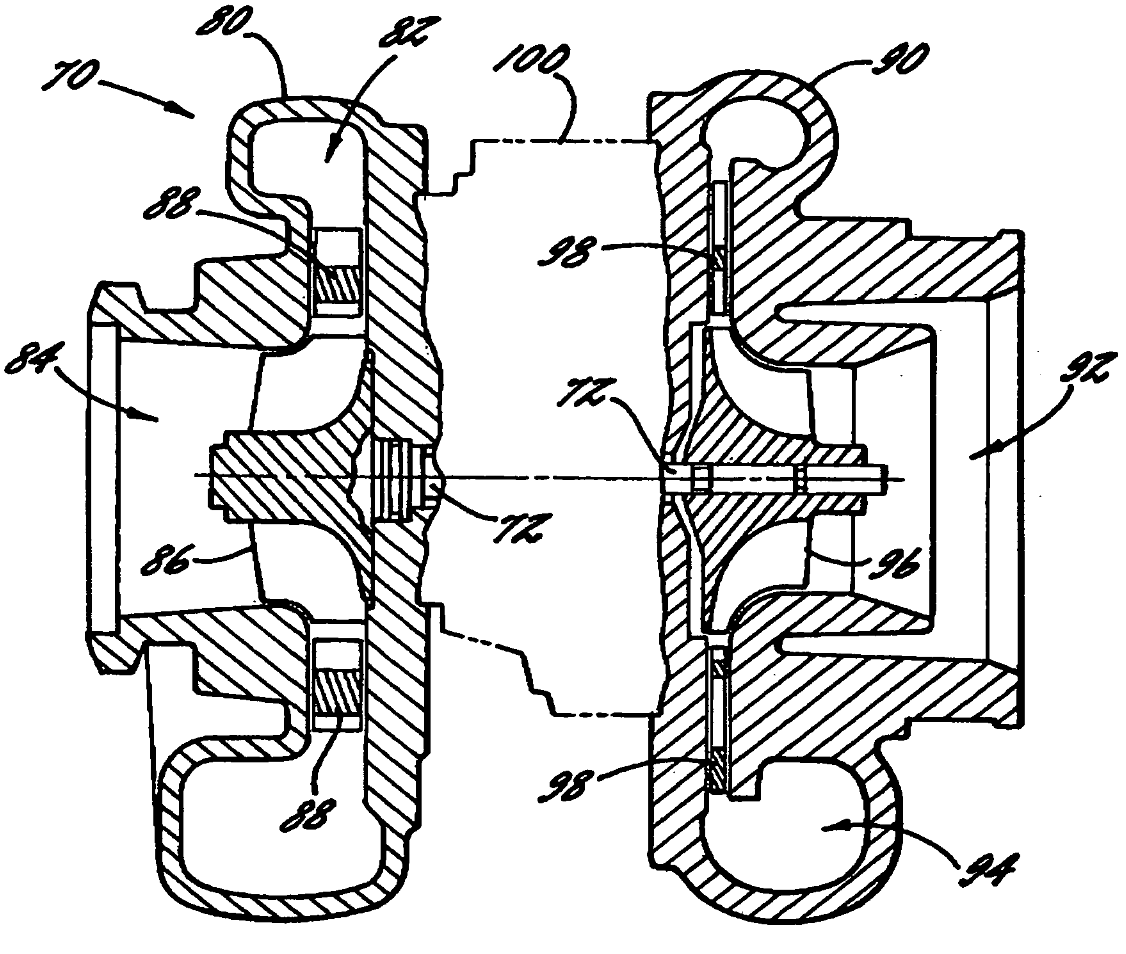
Figure 3:
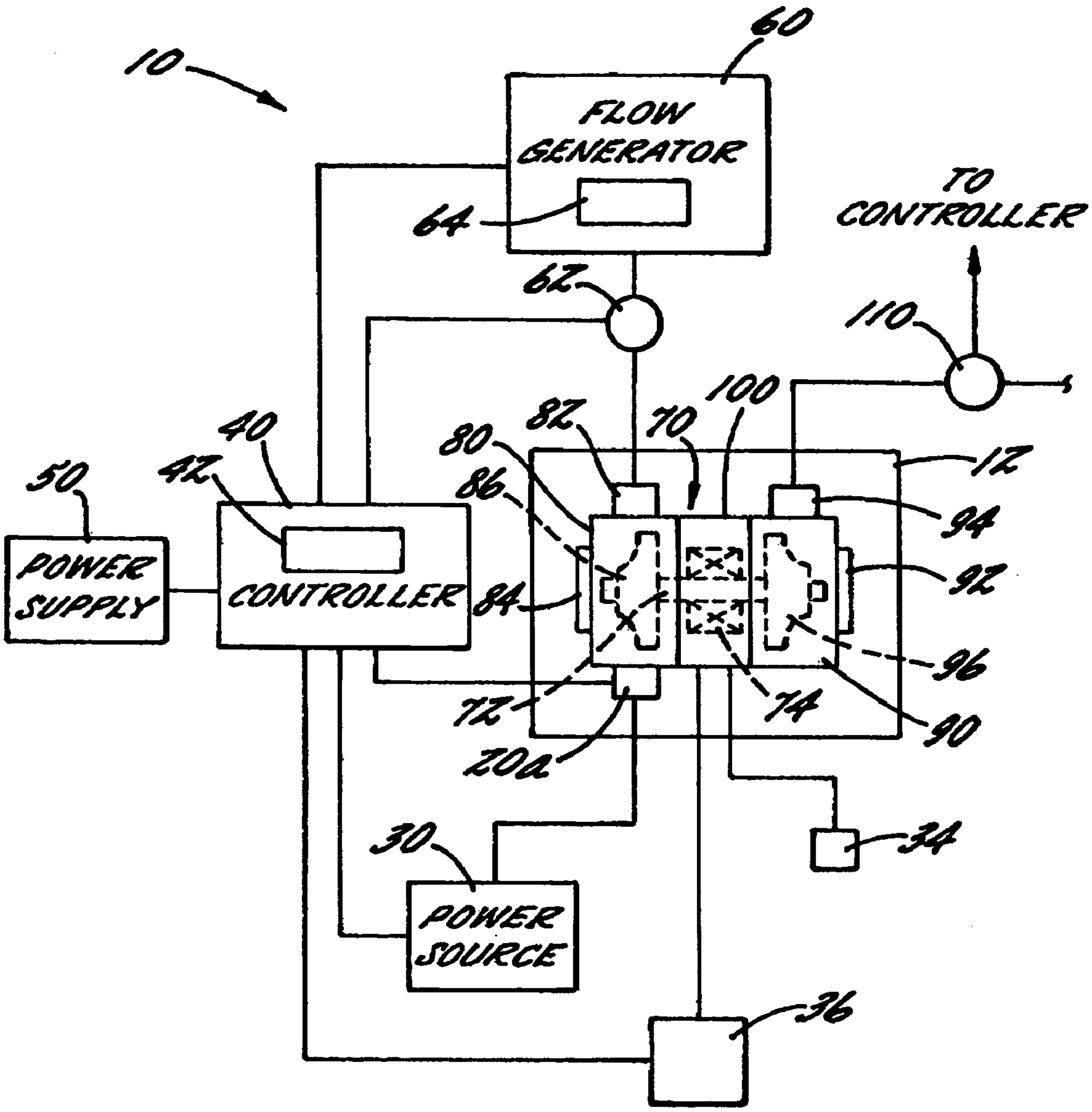

Having thus described the invention in general terms, reference will now be made to the accompanying drawings, which are not necessarily drawn to scale, and wherein:

FIG. 1 is a schematic view illustrating a system according to one embodiment of the present invention, which can be used to diagnostically test the operation of a rotary flow device that is hydraulically actuated;

FIG. 2 is a partially cut-away view of a turbocharger with variable vanes capable of being tested with the system of FIG. 1; and FIG. 3 is a schematic view illustrating a system according to another embodiment of the present invention.

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Referring now to the figures and, in particular, FIG. 1, there is shown a diagnostic system 10 for testing the operation of a rotary flow device 70. The system 10 can be used to test a variety of flow devices. For example, as shown in FIG. 1, the rotary flow device 70 is a turbocharger, including a variable nozzle turbine with a variable-geometry mechanism that can be adjusted between any number of open and closed positions. In particular, as illustrated in FIG. 2, the device 70 can be a turbocharger that includes adjustable vanes 88 positioned between an inlet 82 of a turbine 80 and a rotatable turbine wheel 86 thereof, and/or adjustable vanes 98 positioned between a rotatable compressor wheel 96 and an outlet 94 thereof. During typical operation of the turbocharger, the turbine 80 receives a flow of gas through the inlet 82, and discharges the gas to the outlet 84. While flowing through the turbine 80, the gas rotates a turbine wheel 86 that is rotatably mounted in the turbine 80, thereby also rotating a compressor wheel 96 in the compressor 90 via a shaft 72. The shaft 72 extends through a center housing 100 disposed between the turbine 80 and compressor 90, and the turbocharger typically includes one or more bearings 74 or other components for supporting the shaft 72. The vanes 88, 98 can be configured for sliding, rotating, or otherwise adjusting to control the flow of gas through the respective portions 80, 90 of the device 70. Alternatively, the variable-geometry mechanism for the turbine can comprise an axially-sliding piston for varying the turbine nozzle flow area. Adjustable features for controlling the operation of turbines and compressors are further described in U.S. Pat. No. 6,729,134, entitled "VARIABLE GEOMETRY TURBO- CHARGER HAVING INTERNAL BYPASS EXHAUST GAS FLOW," issued May 4, 2004; U.S. Pat. No. 6,681,573, entitled "METHODS AND SYSTEMS FOR VARIABLE GEOMETRY TURBOCHARGER CONTROL," issued Jan. 27, 2004; and U.S. Pat. No. 6,679,057, entitled "VARIABLE GEOMETRY TURBOCHARGER," issued Jan. 20, 2004, each of which is assigned to the assignee of the present invention, and each of which is incorporated herein in its entirety by reference. While the system 10 is described below primarily in connection with the testing of a turbine 80 of a turbocharger, it is understood that the system 10 is not limited to such a function and can be used in various other applications. That is, in other embodiments of the present invention, the system 10 can be used to test the compressor 90 of the turbocharger, or to test components of other devices.

The system 10 can be used to test the operation of a turbocharger before or after the turbocharger is installed for use, e.g., in the engine system of an automobile. If the turbocharger has been installed on an engine, the turbocharger is typically removed from the engine and connected to the system 10 for testing. In some embodiments of the present invention, the system 10 can be portable, i.e., having a size and weight that are sufficiently small to allow the system 10 to be relocated to a testing facility, repair facility, or the like. Thus, the system 10 can be used as a diagnostic tool for determining the operational condition of a device in connection with the manufacture of the device or after the device has been installed and used, e.g., to diagnose an operational problem in an engine or otherwise.

As shown in FIG. 1, the system 10 typically includes a fixture 12 for supporting the device 70 to be tested. The device 70 can be placed in or on the fixture 12 with or without connecting the device 70 to the fixture 12, e.g., using clamps, bolts, or the like to secure the device 70 to the fixture 12 for a testing operation. As noted above, the illustrated device 70 is a turbocharger that includes a turbine 80 and compressor 90, both of which can be tested, either individually or in combination, as described below.

Either or both of the turbine 80 and compressor 90 can be adapted to provide adjustable geometry during operation. For example, the variable, i.e., adjustable, vanes 88, 98 can be adjusted between open and closed positions in the respective flow device 80, 90 to change the degree of restriction to the flow of gas therethrough. The vanes 88, 98 can be adjustable to a number of successive positions through a range of motion to provide a continuously adjustable flow path for the gases flowing through the device 70.

The adjustment of the vanes 88, 98 can be controlled hydraulically, pneumatically, electrically, or otherwise. For example, as illustrated in FIG. 1, a control valve 20 can be provided for adjusting the vanes 88 of the turbine 80. The control valve 20 can include an electronically operable solenoid that selectively opens and closes a fluid chamber for opening or closing the vanes 88. The valve 20 can be a hydraulic device configured to receive a liquid, such as hydraulic oil, or the valve 20 can be a pneumatic device configured to receive a gas such as air. Further, in some cases, the vanes 88, 98 can be configured to be adjusted by a fluid that is pressurized above atmospheric pressure, or a fluid that is provided at a reduced pressure, i.e., a vacuum adjustment.

As illustrated, the system 10 generally includes a power source 30 in operable communication with the variable vanes 88 of the turbine 80 so that the power source 30 can adjust the position of the vanes 88. Various types of power sources can be provided and used for adjustment of the vanes 88, 98. For example, in the embodiment illustrated in FIG. 1, the power source 30 is a pump configured to provide a flow of oil to the control valve 20 for adjusting the vanes 88. That is, the turbine 80 can selectively receive the oil in a chamber via the valve 20, such that the pressure of the oil in the chamber actuates the vanes 88 to a particular configuration, thereby changing the geometry of the system 10. As illustrated, a pressure gauge 32 can detect the pressure of the fluid connection between the power source 30 and the valve 20. The gauge 32 can indicate the detected pressure to the operator and/or communicate the detected pressure to other components of the system 10.

In other embodiments of the present invention, the power source 30 can instead be configured to provide other fluids, such as gases, and the system 10 can be configured for testing devices other than the turbine 80 illustrated in FIG. 1. For example, if the vanes 88 of the turbine 80 are configured to be pneumatically adjusted, the power source 30 can be a compressor or other pneumatic power source that provides a pressurized gas for that purpose. In some cases, the vanes 88, 98 can be vacuum actuated, i.e., by application of a gas from the power source at a pressure less than atmospheric pressure. Alternatively, as illustrated in FIG. 3, the power source 30 is an electric power source configured to selectively adjust the device 70. Thus, the rotary flow device 70 illustrated in FIG. 3 can be a turbocharger with a turbine 80 that includes an adjustment device other than a fluid valve, such as an electric actuator 20*a*, i.e., a solenoid or other transducer that responds to an electric signal by mechanically actuating the position of the vanes 88 or other configuration of the device 70. The power source 30 can be configured to provide a corresponding signal to the adjustment device, such as an electric signal to the electric actuator 20*a*. Thus, the power source 30 can adjust the vanes 88 of the turbine 80 to various positions by providing electric signals of varying voltages and/or currents.

The adjustment of the vanes 88 can be controlled by a controller 40, such that the controller 40 can selectively adjust the vanes 88 to different positions during a test operation. The controller 40 is typically an electrical device that receives electric power from a power supply 50, and issues an electrical signal to control the operation of the valve 20. In some cases, the controller 40 can be a relatively simple device, such as an electric switch that can be actuated by a user to initiate a particular test operation. Alternatively, the controller 40 can include a processor, such as a programmable logic device, a computer, or the like, and the controller 40 can be configured to automatically control the system 10 according to inputs from the system 10, the turbine 80, or an operator and/or according to a set of preprogrammed instructions. In this regard, the controller 40 can include a memory 42 for storing instructions for controlling the system 10. Typically, the controller 40 provides an DC electric signal, such as a 12 VDC signal to the device 70, or other voltages according to the operating voltage of the valve 20.

The system 10 also includes a flow generator 60 that provides a flow of gas, e.g., to the inlet 82 of the turbine 80 for rotating the turbine wheel 86 in the turbine 80 and simulating an operation of the device 70. In particular, the flow generator 60 can include an electric flow generation device, such as an electric fan or compressor that is configured to provide a flow of air to the turbine 80. For example, the flow generator 60 can be an electric flow bench such as the SF-110 Flowbench available from Superflow Corporation of Colorado Springs, Colo. The gas can flow directly from the generator 60 to the turbine 80, or the gas can flow via a pressurized vessel (not shown). Alternatively, the flow generator 60 can include other flow generation devices, which can provide air or other gases. Further, in some cases, the flow generator 60 can include a heater 64 or otherwise heat the gas before it flows through the turbine 80. For example, the flow generator 60 can be a jet engine that generates a flow of hot exhaust to be delivered to the inlet 82 of the turbine 80.

In any case, the flow generator 60 can provide a flow of gas to the turbine 80 at a predetermined rate, e.g., to simulate the exhaust output of an engine that is typically delivered to the inlet 82 of the turbine 80 during normal operation. Further, the flow generator 60 can be adjustable to change the gas output therefrom. In this regard, the flow generator 60 can provide gas at a variety of flow rates, e.g., to simulate the exhaust output of an engine at different operating conditions of the engine. A flow meter 62 can detect the flow rate and/or the pressure of the gas delivered to the inlet 82 of the turbine 80. The flow meter 62 can indicate the flow rate and/or pressure to an operator of the system 10 and/or communicate a feedback signal representative of the flow rate to the flow generator 60 and/or the controller 40.

The controller 40 can be configured to control the flow generator 60. For example, the controller 40 can be electrically connected to the flow generator 60, and the flow generator 60 can be configured to receive electrical control signals from the controller 40 and respond accordingly by providing a flow corresponding to the control signal. For example, the controller 40 can be configured to provide a signal to control the flow generator 60 to provide a particular flow rate. With the flow generator 60 operating at a particular setting, as determined by the controller 40, the flow rate of gas to the device 70 is typically dependent on the restriction to flow that the device 70 provides. That is, the flow rate typically increases as the device 70 is adjusted to provide a lesser restriction to flow and decreases as the device 70 is adjusted to provide a greater restriction to flow. For example, as the vanes 88 of the turbine 80 are adjusted to a more open configuration, the flow rate typically increases, and as the vanes 88 are adjusted to a more closed configuration, the flow rate typically decreases.

The system 10 can also be configured to provide a flow of oil to the turbocharger for lubrication of the turbocharger during the testing operation. In this regard, if the power source 30 is an oil pump, as shown in FIG. 1, some of the oil delivered by the pump can be delivered to the center housing 100 of the turbocharger, e.g., to lubricate the bearings 74 therein that support the rotatable shaft 72 connecting the turbine 80 and compressor 90. Oil can similarly be delivered to other portions of the device 70 for lubrication and/or cooling. After flowing through the device 70, the oil can be discharged to a drain 34, from which the spent oil can be discarded or returned to the power source 30 for recirculation after cooling, filtering, or other processing. In some cases, the drain 34 can include a clear tube that receives the oil circulated through the device 70 and drains the oil to an outlet, such that an operator can visually verify the flow of oil through the device 70 by observing the flow of oil in the clear tube of the drain 34. Alternatively, the drain 34 can include a flow meter or flow sensor configured to monitor the flow of oil through the device 70. If the power source 30 is not configured to provide a flow of oil to the device 70, such as is the case in the embodiment of FIG. 3 where the power source 30 is an electric power source, the system 10 can include a separate pump 36 or the like to provide a flow of lubricant to the device 70, e.g., to lubricate the bearings 74 in the center housing 100.

The operational condition of the device 70 can be determined by monitoring the response of the device 70 during the testing operation. Such monitoring can be conducted by an operator or automatically by the system 10, such as by the controller 40. In either case, monitoring can be performed at any time during the testing operation. For example, as described above, the controller 40 and power source 30 are configured to adjust the variable vanes 88 to at least one predetermined position during testing. If the power source 30 is configured to provide a fluid to the control valve 20, the opening of the valve 20 typically results in a temporary reduction in pressure. The characteristic reduction in pressure may not occur if the valve 20 does not open, e.g., because the valve 20 is stuck in some position, or the valve actuator is not operative, or the like. Similarly, the pressure may not be restored as expected if the valve 20 becomes stuck upon opening, if the valve 20 is leaking, or the like. Thus, an operator can visually check the pressure monitoring device 32 during and after the adjustment of the control valve 20 and verify that the pressure drops as the valve 20 opens, then is restored soon thereafter. Alternatively, the system 10 can automatically perform this monitoring function. For example, in this regard, the controller 40 can be configured to communicate with the pressure monitor 30 or otherwise detect the change in pressure, flow, or other communication between the power source 30 and the rotary flow device 70 upon adjustment of the valve 20, and compare the change with a predetermined characteristic response. In any case, the operator or the controller 40 can determine by way of the test operation whether the valve 20 is operating correctly. If a problem is detected, the device 70 can be replaced or repaired accordingly.

The system 10 can also be used to test the operation of the vanes 88 or other variable-geometry mechanism, e.g., whether the vanes 88 open and/or close as desired upon actuation of the valve 20. In this regard, it is noted that the flow of gas through the device 70 can be monitored in conjunction with the adjustment of the vanes 88. In a typical turbine of a turbocharger, the resistance to the flow of the gas through the turbine 80 is reduced as the vanes 88 are opened, and the resistance to the flow is increased as the vanes 88 are closed. The particular amounts of reduction or increase in flow resistance can be determined according to the type of turbocharger, the size and configuration of the turbine 80, the geometry and adjustment of the vanes 88, the speed and mass flow rate of the gas through the turbine 80, temperature, and the like.

Thus, the system 10 can be used to test the operational condition of the device 70 by monitoring the flow rate through the device 70 as the vanes 88 are adjusted. For example, the controller 40 can communicate with the power source 30 and/or the valve 20 to adjust the vanes 88 of the device 70 to an open position. With the vanes 88 open, the controller 40 can also communicate with the flow generator 60 to provide a first flow rate of gas to the device 70. Thereafter, the controller 40 can adjust the vanes 88 to a partially or fully closed position. The closing of the vanes 88 should typically restrict the flow of gas through the device 70, and the flow rate should therefore decrease to a second rate. The second flow rate can be determined by the flow generator 60 or the flow meter 62. In particular, a value indicative of the flow rate can be indicated on a gauge or other display to the operator, or communicated to the controller 40. The controller 40 can compare the second flow rate to another flow rate to determine if the flow through the device 70 changed as expected with the adjustment of the vanes 88. For example, the second flow rate can be compared to the first flow rate. Further, the controller 40 can determine if the relationship between the first and second flow rates falls within an acceptable range. Alternatively, the controller 40 can compare the flow rates to values or ranges stored in the memory 42 to determine if the flow rates are acceptable. For example, the controller 40 can compare the first and/or the second flow rate to values determined by operating the system 10 with a reference device, i.e., a device that is known to be properly configured.

Generally, a flow rate that is higher than expected, or higher than an acceptable value, can indicate that the vanes 88 are not properly restricting the flow through the device 70. For example, one or more of the vanes 88 can be stuck in the open position or otherwise failing to actuate to the closed position, which may be because the valve 20 is broken or because the valve 20 is not being properly actuated. A higher than expected flow rate can also occur if the vanes 88 are adjusted to the closed position but are broken or otherwise leaking. Alternatively, a flow rate that is lower than expected can occur if the vanes 88 are stuck in the closed position, if the valve 20 is not actuating properly, or if the flow path through the device 70 is obstructed by debris. Similarly, a higher or lower flow rate can result if one or more of the vanes 88 is not configured according to the specifications of the device 70, e.g., if the dimensions of the vane(s) 88 are different than as specified or if the vane(s) 88 are improperly assembled with the device 70.

While first and second flow rates are described in the foregoing example, it is understood that any number of flow rates can be achieved, measured, and compared during testing of the device 70. In fact, the vanes 88 of the device 70 can be adjusted throughout their entire range of motion, and the resulting flow rates through the device 70 that occur during such testing can be monitored, evaluated, and/or recorded as an indication of the operational condition of the device 70.

It is also appreciated that multiple aspects of the operational condition of the device 70 can be tested and evaluated simultaneously or consecutively. For example, the operation of the valve 20 and the vanes 88 can be tested as described above during a single test operation or during multiple tests. In addition, the system 10 can be adapted to test multiple portions of the device 70. For example, while the system 10 is described above primarily in connection with the testing of the turbine 80, the system 10 can similarly be used to test the operation of the compressor 90. That is, the device 70 can be connected to the system so that an inlet 92 of the compressor 90 receives a flow of gas from the flow generator 60. A valve or other control member of the compressor 90 can be actuated by the system 10, e.g., to control variable vanes 98 or other adjustable features of the compressor 90. As the gas flows through the compressor 90 and is discharged from an outlet 94 of the compressor 90, the system can detect the flow rate, pressure, or other aspects of flow that are characteristic of the operational condition thereof.

Further, multiple portions of the system 10 can be tested as part of a single testing operation. For example, as shown in FIG. 1, a pressure monitoring device 110, such as a pressure gauge, can be connected to the outlet 94 of the compressor 90 and configured to measure the pressure of the gas discharged through the outlet 94. With the system 10 configured as shown in FIG. 1 to deliver a flow of gas through the turbine 70, the flow of gas from the flow generator 60 can rotate the turbine wheel 86, the shaft 72, and the compressor wheel 96, thereby compressing gas in the compressor 90 at the outlet 94 thereof. The ideal pressure of the gas developed at the outlet 94 can be determined, at least in part, by the speed of rotation of the compressor wheel 96, the configuration of the compressor 90 including the position of the vanes 98 or other adjustable feature of the compressor 90, the temperature of the gas, and the like. Thus, the pressure monitoring device 110 can indicate actual pressure characteristics of the operation of the compressor 90. For example, the monitoring device 110 can indicate the pressure directly to an operator with text or graphics or can communicate a signal characteristic of the pressure to the controller 40 for automatic monitor and evaluation thereby. Alternatively, other flow monitoring devices can be used to monitor the output of the compressor 90, such as a flow rate meter or the like.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A diagnostic system for testing the operation of a first rotary flow device having a variable-geometry mechanism for regulating flow through the device, the system comprising: an electric air flow generator configured to be connected to the rotary flow device to provide a flow of air to an inlet of the device, the air flow generator being configured to provide a flow of air through the device at a predetermined flow rate; a power source in operable communication with the variable-geometry mechanism of the device such that the power source is configured to adjust a position of the variable-geometry mechanism; and a controller configured to selectively control an adjustment of the position of the variable-geometry mechanism, wherein the controller and power source are configured to actuate the variable-geometry mechanism to at least one predetermined position such that an operational condition of the device can be determined according to the flow of air through the device.

2. A system according to claim 1 wherein the controller is configured to control the power source to selectively actuate the variable-geometry mechanism between a plurality of predetermined positions.

3. A system according to claim 1 wherein the controller is configured to monitor the flow of air from the air flow generator through the device and detect a change in the flow corresponding to the adjustment of the variable-geometry mechanism.

4. A system according to claim 1, further comprising an oil source configured to provide a flow of oil to the device and thereby lubricate the device.

5. A system according to claim 1 wherein the power source is configured to provide electric power to an actuator of the device for adjusting the variable-geometry mechanism.

6. A system according to claim 1 further comprising a monitoring device configured to detect an output of a second flow device in communication with the first device and configured to be rotated by the flow of the air through the first device.

7. A system according to claim 1 wherein the power source is fluidly connected to a control valve of the rotary flow device configured to control a position of the variable-geometry mechanism, the power source being configured to fluidly communicate with the variable-geometry mechanism via the control valve and the controller being configured to control an actuation of the control valve and thereby selectively adjust the position of the variable-geometry mechanism.

8. A system according to claim 7 wherein the power source is a pump configured to provide a flow of oil to the device via the control valve for adjusting the position of variable-geometry mechanism.

9. A system according to claim 7 wherein the power source is a gas source configured to provide a gas with a pressure differential relative to an atmospheric pressure to the device via the control valve for adjusting the position of variable-geometry mechanism.

10. A system according to claim 7, further comprising a pressure monitor configured to monitor the pressure of fluid delivered between the power source and the device, wherein the controller is configured to monitor the pressure in connection with an operation of the valve and thereby determine an operating condition of the valve.

11. A system according to claim 7 wherein the valve is a solenoid valve and the controller is an electronic controller configured to selectively provide a voltage for controlling the valve.

12. A method for diagnostically testing the operation of a first rotary flow device with a rotatable wheel and a variable-geometry mechanism, the method comprising: providing a flow of air with an electric air flow generator to an inlet of the device at a predetermined flow rate and thereby rotating the rotatable wheel of the device; selectively adjusting a position of the variable-geometry mechanism of the device; and determining an operational condition of the device according to the flow of air through the device.

13. A method according to claim 12 wherein said adjusting step comprises automatically controlling the adjustment of the variable-geometry mechanism between a plurality of predetermined positions.

14. A method according to claim 12 wherein said determining step comprises monitoring the flow of air from the air flow generator through the device and detecting a change in the flow corresponding to the adjustment of the variable-geometry mechanism.

15. A method according to claim 12, further comprising providing a flow of oil to the device and thereby lubricating the device.

16. A method according to claim 12 wherein said determining step comprises successively adjusting the variable-geometry mechanism to a plurality of predetermined positions.

17. A method according to claim 12 wherein said determining step comprises detecting at least one of the pressure and flow of the fluid and thereby determining the relative position of the variable-geometry mechanism.

18. A method according to claim 12, further comprises adjusting the flow of air through the device in combination with said step of adjusting the variable-geometry mechanism.

19. A method according to claim 12, further comprising providing the device, the device being at least one of a turbine and a compressor, and wherein said determining step comprises determining an operational condition of the variable-geometry mechanism thereof.

20. A method according to claim 12 wherein said determining step comprises detecting at least one of the conditions consisting of a stuck vane, a broken vane, and a missing vane.

21. A method according to claim 12 wherein said determining step comprises detecting a faulty control valve of the device.

22. A method according to claim 12 further comprising detecting the output of a second device in communication with the first device and configured to be rotated by the flow of air through the first device.

23. A method according to claim 12 wherein said adjusting step comprises providing fluid in communication with a control valve of the rotary flow device and thereby adjusting the position of the variable-geometry mechanism.

24. A method according to claim 23 wherein said adjusting step comprises providing a gas with a pressure differential relative to an atmospheric pressure to the device via the control valve for adjusting the position of variable-geometry mechanism.

25. A method according to claim 23, further comprising monitoring the pressure of fluid delivered between the power source and the device and a corresponding operation of the valve to thereby determine an operating condition of the valve.

26. A method according to claim 23 wherein said adjusting step comprises selectively providing an electric voltage to the valve for controlling the valve.

* * * * *